US012580094B2

(12) United States Patent
Ranganathan et al.

(10) Patent No.: US 12,580,094 B2
(45) Date of Patent: Mar. 17, 2026

(54) OVERHEAD CONDUCTORS WITH HIGH-TEMPERATURE RESISTANT CURED COATINGS

(71) Applicant: Prysmian S.p.A., Milan (IT)

(72) Inventors: Sathish Kumar Ranganathan, Avon, IN (US); Xi Zhang, Carmel, IN (US); Timothy William Ochmann, Union, KY (US); Donald Ray Parris, Lexington, SC (US)

(73) Assignee: Prysmian S.p.A., Milan (IT)

( * ) Notice: Subject to any disclaimer, the term of this patent is extended or adjusted under 35 U.S.C. 154(b) by 0 days.

(21) Appl. No.: 18/485,670

(22) Filed: Oct. 12, 2023

(65) Prior Publication Data

US 2025/0125065 A1 Apr. 17, 2025

(51) Int. Cl.
| | |
|---|---|
| *H01B 1/22* | (2006.01) |
| *C08K 3/36* | (2006.01) |
| *C09D 5/24* | (2006.01) |
| *C08K 3/22* | (2006.01) |
| *C08K 3/30* | (2006.01) |

(52) U.S. Cl.
CPC ................. *H01B 1/22* (2013.01); *C08K 3/36* (2013.01); *C09D 5/24* (2013.01); *C08K 2003/2241* (2013.01); *C08K 2003/3045* (2013.01)

(58) Field of Classification Search
CPC .... H01B 1/22; C08K 3/36; C08K 2003/2241; C08K 2003/3045; C09D 5/24
See application file for complete search history.

(56) References Cited

U.S. PATENT DOCUMENTS

| | | | |
|---|---|---|---|
| 7,105,047 B2 | 9/2006 | Simmons et al. | |
| 9,328,245 B2 | 5/2016 | Siripurapu et al. | |
| 10,332,658 B2 | 6/2019 | Mhetar et al. | |
| 10,586,633 B2 | 3/2020 | Davis et al. | |
| 2018/0118952 A1 * | 5/2018 | Ranganathan | B05D 7/20 |
| 2022/0010142 A1 | 1/2022 | Ranganathan et al. | |
| 2022/0395809 A1 * | 12/2022 | Coogan | B05D 7/20 |

FOREIGN PATENT DOCUMENTS

| | | | |
|---|---|---|---|
| WO | WO-2021152311 A1 * | 8/2021 | B01J 1/063 |
| WO | 2021181076 A1 | 9/2021 | |

OTHER PUBLICATIONS

Poole, Robert; Extended European Search Report; Feb. 24, 2025; EP Pat. App. No. 24206024.2; 7 pages.

* cited by examiner

*Primary Examiner* — Haidung D Nguyen
(74) *Attorney, Agent, or Firm* — FBT GIBBONS LLP

(57) ABSTRACT

An overhead conductor includes a bare conductor coated with a cured coating composition formed from a single-part coating dispersion. The cured coating composition includes silicon dioxide or derivatives thereof, one or more metals from Groups IA-IIIA of the periodic table, one or more acrylates, titanium dioxide, and optionally, barium sulfate. A method of making a coated overhead conductor includes preparing the single-part coating dispersion, applying the coating dispersion to a bare conductor, and curing the coating dispersion to form the coated overhead conductor. The single-part coating dispersion includes silicon dioxide, one or more metal silicates, one or more acrylates, titanium dioxide, water, and optionally, barium sulfate.

12 Claims, 4 Drawing Sheets

100

120

110

130

200

210

220

300

320

310

330

400

410

420

OVERHEAD CONDUCTORS WITH HIGH-TEMPERATURE RESISTANT CURED COATINGS

TECHNICAL FIELD

The present application relates to overhead conductors. More specifically, the present application relates to overhead conductors having a cured coating that is resistant to high temperatures and water-aging. The present application also relates to a method for making a coated overhead conductor by applying a single-part coating dispersion and curing the coating dispersion at ambient temperature.

BACKGROUND

As the need for electricity continues to grow, the need for higher capacity transmission and distribution lines grows as well. The amount of power a transmission line can deliver is dependent on the current-carrying capacity (ampacity) of the line. The ampacity of a line is limited by the maximum safe operating temperature of the bare conductor that carries the current. Exceeding this temperature can result in damage to the conductor or the accessories of the line. Moreover, the conductor gets heated by Ohmic losses and solar heat and it gets cooled by conduction, convection and radiation. The amount of heat generated due to Ohmic losses depends on current (I) passing through it and its electrical resistance (R) by the relationship Ohmic losses=$I^2R$. Electrical resistance (R) itself is dependent on temperature. Higher current and temperature leads to higher electrical resistance, which, in turn, leads to more electrical losses in the conductor.

While several coatings have been proposed to reduce the operating temperature of conductors, increase the heat emissivity of conductors, and/or improve the durability of conductors, there remains a need for overhead conductors having high-temperature resistant and water-aging resistant coatings formed from single-part (or one-pot composition), water-based compositions that are curable at ambient temperatures. There also remains a need for an overhead conductor with a coating that exhibits a long-term thermal resistance at temperatures that exceed 150° C.

U.S. Pat. No. 10,586,633 relates to a surface modified overhead conductor with a coating. The coating composition comprises a binder (such as a metal silicate or colloidal silica in an amount of 20-60 wt. % of dry composition) and a heat radiating agent (such as titanium oxide or silicon oxide in an amount of 10-20 wt. % of dry composition). If any organic ingredients are used, they should be less than about 10 wt % of dry composition.

SUMMARY

Accordingly, an exemplary embodiment of the present invention provides an overhead conductor including a bare conductor coated with a cured coating composition including about 30% to about 65%, by dry weight, of silicon dioxide or a derivative thereof; about 10% to about 20%, by dry weight, of one or more acrylates; about 5% to about 45%, by dry weight, of titanium dioxide; and about 1% to about 25%, by dry weight, of at least one metal selected from Groups IA-IIIA of the periodic table of elements.

The present invention may also provide a method making a coated overhead conductor, the method including preparing a single-part coating dispersion, applying the single-part coating dispersion to a bare overhead conductor; and curing the coating dispersion, at ambient temperature, to form the coated overhead conductor. The single-part coating dispersion includes about 1% to about 25%, by weight, of silicon dioxide; about 0.3% to about 10%, by weight, of one or more metal silicates, wherein the metal of the metal silicate is selected from Groups IA-IIIA of the periodic table of elements; about 3% to about 10%, by weight, of one or more acrylates; about 2% to about 25%, by weight, of titanium dioxide; and about 30% to about 70%, by weight, of water.

Other objects, advantages and salient features of the invention will become apparent from the following detailed description, which, taken in conjunction with the annexed drawings, discloses embodiments of the present invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein.

DETAILED DESCRIPTION OF THE EXEMPLARY EMBODIMENTS

Figure 1:
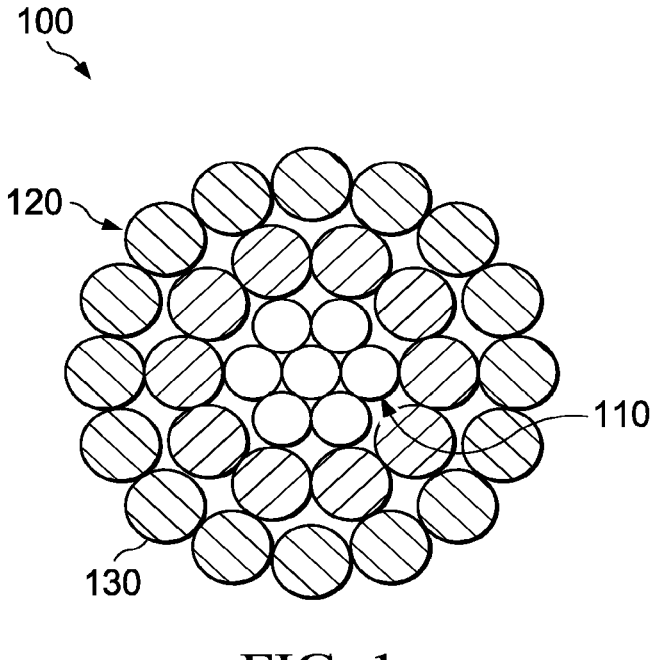
FIG. 1 is a cross sectional view of a conductor in accordance with one embodiment of the present invention.
Figure 2:
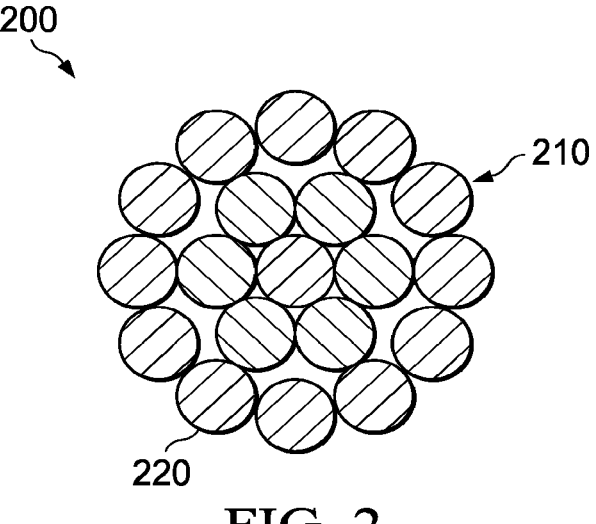
FIG. 2 is a cross sectional view of a conductor in accordance with one embodiment of the present invention.
Figures 3, 4:
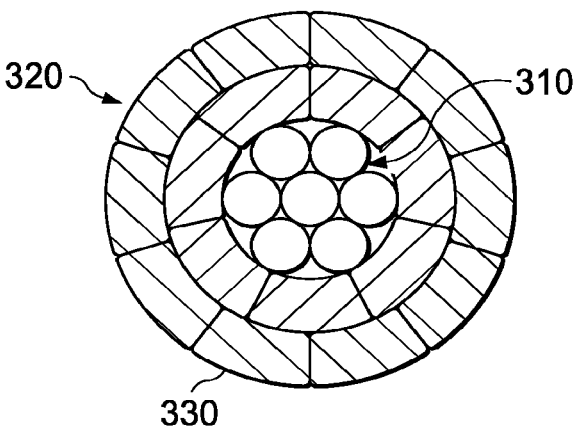
FIG. 3 is a cross sectional view of a conductor in accordance with one embodiment of the present invention.
FIG. 4 is a cross sectional view of a conductor in accordance with one embodiment of the present invention.

For the purpose of the present description and of the appended claims, except where otherwise indicated, all numbers expressing amounts, quantities, percentages, and so forth, are to be understood as being modified in all instances by the term "about." Also, all ranges include any combination of the maximum and minimum points disclosed and include any intermediate ranges therein, which may or may not be specifically enumerated herein.

The present disclosure, in at least one of the mentioned aspects, can be implemented according to one or more of the present embodiments, optionally combined together.

For the purpose of the present description and of the appended claims, the words "a" or "an" should be read to include one or at least one and the singular also includes the plural unless it is obvious that it is meant otherwise. This is done merely for convenience and to give a general sense of the disclosure.

As used herein, all percentages (%) are percent by weight of the total composition, unless otherwise indicated. Also, as used herein, the terms "wet" refers to relative percentages of the coating dispersion in a medium (i.e., water); and "dry" refers to the relative percentages of a dry coating composition prior to the addition of the dispersion medium or of a cured coating composition when the dispersion medium is eliminated. In other words, the dry percentages are those present without taking the dispersion medium into account.

As used herein, the term "ambient temperature" refers to a temperature range of from 5° C. to 50° C.

As will be described herein, overhead conductors are disclosed that include a bare conductor coated with a cured coating composition. In certain embodiments, the cured coating composition can include one or more of silicon dioxide and derivatives thereof, acrylates, titanium oxide, at least one metal selected from Group IA-IIIA of the periodic table of elements and optionally barium sulfate. Such cured coating composition can be thermal resistant at 250° C. for 7 days. Such cured coating composition can be water resistant at 90° C. for 7 days. The cured coating composition can also pass a Mandrel Bend Test after heat aging at 250° C. for 7 days and/or after water aging at 90° C. for 7 days. The cured coating composition can be formed from the single-part coating dispersion of the present disclosure, where such single-part coating dispersion can be cured at ambient temperatures and have a pot life of about 24 hours or longer.

As used herein, the term "pot life" refers to a time span when the single-part coating dispersion maintains its viscosity.

Suitable examples of silicon dioxide can include amorphous silica, colloidal silica, and crystalline silica such as quartz, but it will be appreciated that any of a variety of suitable types of silica can be used in the coating composition. In certain embodiments, the silicon dioxide for the present coating has an average particle size of 0.05 microns to 10 microns.

In certain embodiments, the single-part coating dispersion can include about 1% to about 25%, by weight, of silicon dioxide; in certain embodiments, about 5% to about 22%, by weight, of silicon dioxide; and in certain embodiments, about 10% to about 21%, by weight, of silicon dioxide. In certain embodiments, the method can include using silicon dioxide in the form of silica-sol or colloidal silica.

Suitable examples of silicon dioxide derivatives can include silicates with at least one metal selected from elements of Group IA-IIIA of the periodic table. Suitable examples of such silicates can include, but are not limited to, potassium silicate, sodium silicate, lithium silicate, magnesium silicate, aluminum silicate, and hydrated forms and combinations thereof.

In certain embodiments, the single-part coating dispersion can include about 0.3% to about 10%, by weight, of one or more silicates.

The cured coating composition of the present disclosure can include about 30% to about 65%, by dry weight, of silicon dioxide or a derivative thereof. In certain embodiments, the cured coating composition can include about 35% to about 60%, by dry weight, of a silicon dioxide or a derivative thereof.

The cured coating composition coating the conductor of the present disclosure can include about 1% to about 25%, by dry weight, of one or more metal selected from Groups IA-IIIA of the periodic table of elements. In certain embodiments, the cured coating composition coating the conductor can include about 2% to about 10%, by dry weight, of such metal as described herein. Suitable examples of metal can include, but are not limited to, aluminum, potassium, sodium, lithium, magnesium, calcium, and combinations thereof.

Suitable examples of acrylates can include hydroxy acrylate, (e.g., hydroxyethyl acrylate); epoxy acrylate; (meth)acrylate homopolymer or (meth)acrylate copolymer (e.g., butylacrylate-methylmethacrylate copolymer) or a styrene-acrylate copolymer, polyacrylic acid or salts thereof such as sodium polyacrylate, but it will be appreciated that any of a variety of suitable types of acrylates can be used.

In certain embodiments, the single-part coating dispersion can include about 3% to about 10%, by weight, of an acrylate; in certain embodiments, about 4% to about 8%, by weight, of an acrylate; and in certain embodiments, about 6%, by weight, of an acrylate.

In certain embodiments, the cured coating composition of the present disclosure can include about 10% to about 20%, by dry weight, of an acrylate; and in certain embodiments, about 10% to about 16%, by dry weight, of an acrylate.

In certain embodiments, the titanium dioxide can be rutile titanium dioxide, but it will be appreciated that any of a variety of suitable types of titanium dioxide can be used.

In certain embodiments, the single-part coating dispersion can include about 2% to about 25%, by weight, of titanium dioxide; and in certain embodiments, about 5% to about 22%, by weight, of titanium dioxide.

In certain embodiments, the cured coating composition coating the conductor of the present disclosure can include about 5% to about 45%, by dry weight, of titanium dioxide; and in certain embodiments, about 8% to about 40%, by dry weight, of titanium dioxide.

In certain embodiments, both the cured coating composition and the single-part coating dispersion can further include barium sulfate. In certain embodiments, the single-part coating dispersion can include from 0.5% to about 9%, by weight, of barium sulfate; and in certain embodiments, up to about 5%, by weight, of barium sulfate. In certain embodiments, the cured coating composition can include from 1% to about 5%, by dry weight, of barium sulfate; and in certain embodiments, up to about 9%, by dry weight, of barium sulfate.

Both the cured coating composition and the single-part coating dispersion can also include other optional ingredients, such as defoamers, abrasion resistant adjuvants, stabilizers, colorants, surfactants, emissivity agents and infrared (IR) reflective additives.

Suitable examples of defoamers (or defoaming agents) are 2-octanol, oleic acid, paraffinic waxes, amide waxes, sulfonated oils, organic phosphates, silicone oils, mineral oils, and dimethylpolysiloxane.

Suitable examples of abrasion resistant adjuvants can include, but are not limited to aluminum oxide, mica, calcium carbonate, and combinations thereof. In certain embodiments, a suitable adjuvant can have an average particle size of about 50 microns or less; in certain embodiments, about 20 microns or less; and in certain embodiments, about 5 microns or less.

In certain embodiments, the single-part coating dispersion can include about 1% to about 10%, by weight, of fillers; and in certain embodiments, about 3% to about 5%, by weight, of fillers. In certain embodiments, the cured coating composition can include about 5% to about 15%, by dry weight, of fillers; and in certain embodiments, about 7% to about 12%, by dry weight, of fillers.

Suitable examples of colorants can include, but are not limited to, cadmium yellow, cadmium red, cadmium green, orange cobalt, cobalt blue, cerulean blue, azurite, malachite, Paris green, phthalocyanine blue BN, phthalocyanine green G, viridian, sanguine, iron oxide pigments (such as caput mortuum, oxide red, raw sienna, burnt sienna, raw umber, burnt umber, and Venetian red), Prussian blue, ultramarine, zinc pigments (zinc white, zinc ferrite), and combinations thereof. In certain embodiments, one or more colorants can be present in the cured coating composition at a concentration of about 0.02% to 1%, by dry weight.

A suitable example of a stabilizer can include a dispersion stabilizer, but it will be appreciated that any of a variety of suitable types of stabilizers can be used in the cured coating composition. In certain embodiments, one or more stabilizers can be present in the cured coating composition at a concentration of about 0.01% to about 2%, by dry weight.

Suitable examples of IR reflective additives can include, but are not limited to barium titanate, cobalt, aluminum, bismuth, lanthanum, neodymium, niobium, vanadium, ferrous, chromium, zinc, manganese, and nickel-based metal oxides and ceramics. In certain embodiments, one or more IR reflective additives can be present in the cured coating composition at a concentration of about 0.1% to about 5%, by dry weight.

Suitable examples of surfactants can include, but are not limited to cationic, anionic, or non-ionic surfactants, and fatty acid salts. In certain embodiments, one or more surfactants can be present in the cured coating composition at a concentration of about 0.05% to about 0.5%, by dry weight.

Suitable examples of emissivity agents can include zirconia metal oxides (such as aluminum oxide, magnesium oxide, calcium oxide, boron oxide, iron oxide, manganese oxide, copper chromium oxide, and chromium oxide) or metal carbides (such as boron carbide silicon carbide), boron nitride, silicon tetraboride, molybdenum disilicide, zirconium diboride, and cupric chromite. Titanium oxide and silicon dioxide can act as emissivity agents, too.

The illustrative coating dispersion described herein can be prepared and stored as a single-part coating dispersion. In certain embodiments, the single-part coating dispersion can have a pot life of at least 24 hours. In certain embodiments, the single-part coating dispersion can have a viscosity of about 10 sec to about 35 sec when measured using a Zahn cup number 3.

FIGS. 1, 2, 3, and 4 illustrate various bare overhead conductors according to certain embodiments. Overhead conductors 100, 200, 300, and 400 can generally include only one or more electrically conductive wires 120, 210, 320 and 410. Each overhead conductor depicted in FIGS. 1-4 can include a cured coating (130, 220, 330, and 420) formed from compositions described herein. Additionally, the overhead conductor can, in certain embodiments, such as those depicted in FIGS. 1 and 3, be formed as aluminum-conductor steel-reinforced (ACSR) cables, where the electrically conductive wires 120, 320 surround steel strength members 110, 310, respectively. The overhead conductors of FIGS. 2 and 4 can be all aluminum conductor (AAC) cables or all aluminum alloy conductor (AAAC) cables.

In embodiments, the cores 110, 310 can be steel, Invar steel, composite materials, any other material that can provide strength to the conductor. In other embodiments, the electrically conductive wires 120, 210, 320, 410 can be made of any suitable electrically conductive material including copper, a copper alloy, aluminum, an aluminum alloy, including aluminum types 1000, 6000 series alloy aluminum, aluminum-zirconium alloy, carbon nanotube, grapheme, or any other electrically conductive material.

Composite core conductors are useful due to having lower sag than all metallic composite conductors at higher operating temperatures and their higher strength to weight ratio. Composite materials are based on glass fiber, carbon fiber, polymeric fibers, aluminum oxide fiber reinforced in aluminum, or any other material that can provide strength and lower sag to the conductor. A polymeric coating can also, or alternatively, be utilized in composite core conductor designs. Non-limiting examples of composite cores can be found in U.S. Pat. Nos. 7,015,395; 7,438,971; U.S. Patent App. No. 2012/0186851; U.S. Pat. No. 7,683,262; and U.S. Patent App. No. 2012/0261158, each of which is incorporated herein by reference.

The single-part coating dispersion can be made in a High-Speed Disperser (HSD), Ball Mill, or Bead mill or by using other techniques known in the art. In certain examples, the single-part coating dispersion is formed by combining one or more of silicon dioxide, one or more silicate of one or more metal selected from Groups IA-IIIA of the periodic table of elements, one or more acrylates, and titanium dioxide, as well as, in certain embodiments, barium sulfate, among other optional ingredients, with water as a dispersion medium. High speed mixing can be performed until desired dispersion is achieved. In such embodiments, the single-part coating dispersion can comprise about 30% to about 70%, by weight, of water. Accordingly, the resulting coating dispersion can be a suspension with a total solid content of about 30%-70%.

In certain embodiments, a surface of the bare overhead conductor can be prepared prior to the application of the single-part coating dispersion. For example, the preparation process can include chemical treatment, pressurized air cleaning, hot water or steam cleaning, brush cleaning, heat treatment, sand blasting, ultrasound, deglaring, solvent wipe, and/or plasma treatment. In one embodiment, the surface of the bare overhead conductor can be deglared by sand blasting.

In certain embodiments, the single-part coating dispersion can be applied by a spray gun at about 0.7 atm to about 3 atm pressure using controlled air pressure. In such embodiments, the spray gun nozzle can be placed perpendicular to the direction of the conductor (e.g., at an approximately 90° angle) to deliver a uniform coating onto the bare overhead conductor. In certain cases, two or more guns can also be used to deliver more efficient coatings. Coating thickness and density can be controlled by the admixture viscosity, gun pressure, and conductor line speed. During the coating application, an overhead conductor temperature can be maintained at ambient temperature. When the coating application is performed on an operating overhead conductor, the latter can reach temperature of 90° C. or more, depending on the material of the conductor, such temperatures being of no harm for the coating application.

Alternatively, in certain embodiments, the single-part coating dispersion can be applied to a bare overhead conductor by one or more of dipping, a brush, foam applicator or by roller. For example, in a dipping process, a conductor can be dipped into the single-part coating dispersion to allow the dispersion to completely coat the conductor. The conductor can then be removed from the single-part coating dispersion and allowed to dry.

After application, the single-part coating dispersion on the overhead conductor can be allowed to cure. In certain embodiments, the single-part coating dispersion can cure at ambient temperature. It will be appreciated, however, that in certain embodiments, the single-part coating dispersion can be exposed to elevated temperatures to facilitate the curing process. In certain embodiments, the single-part coating dispersion can be cured at ambient temperature in less than 24 hours; in certain embodiments, the single-part coating dispersion can be cured at ambient temperature in less than two hours; in certain embodiments, the single-part coating dispersion can be cured at ambient temperature in less than one hour; and in certain embodiments, the single-part coating dispersion can be cured at ambient temperature in less than 30 minutes. The present dispersion is meant to be suitably cured when at the "dry-to-touch" stage where the coating has cured enough so that it can be touched lightly without any adhering to the finger. As used herein, the "dry-to-touch" stage refers to the "dry" stage between the "tack-free" and "dry-hard" stages as defined in ASTM D-1640 (1995).

As can be appreciated, the single-part coating dispersion can also be applied to conductors which are already installed and currently in use. For example, existing conductors can be coated with a robotic system for automated or semi-automated coating. In certain embodiments, the automated system can include cleaning the conductor surface, applying the single-part coating dispersion to the conductor surface, and ambiently curing the dispersion without further additional steps. In certain embodiments, the automated system can further include a drying tool like a heater, a fan, or a drying gas flower to ease and/or accelerate the curing of the dispersion.

The single-part coating dispersion can be applied to a conductor in several ways. For example, a single-part coating dispersion can be applied by coating the individual wires before their assembly in the bare overhead conductor. As can be appreciated, it is possible to coat all of the wires of the conductor, or, more economically, coat only the outer most wires of a conductor. Alternatively, a coating can be applied only to the outer surface of the bare overhead conductor instead of the individual wires. In certain embodiments, the complete outer surface of a bare conductor can be coated. In other embodiments, only a portion of the bare conductor can be coated.

Additionally, the single-part coating dispersion can be applied to overhead transmission line accessories. For example, a substation can include a variety of accessories, including a breaker and a transformer such as a current coupling transformer. The single-part coating dispersion described herein can be applied to one or more of these accessories. As can be appreciated, additional transmission line accessories can also benefit from such a coating including, as non-limiting examples, dead ends/termination products, splices/joints, suspension and support products, motion control/vibration products (sometimes referred to as dampers), guying products, wildlife protection and deterrent products, conductor and compression fitting repair parts, substation products, clamps, and corona rings. A single-part coating dispersion can be applied to such accessories in any suitable manner. For example, the single-part coating dispersion can be applied to a new accessory after cleaning the accessory's surface. Alternatively, the single-part coating dispersion can also be applied to an existing accessory after cleaning the accessory's surface. In each such embodiment, the single-part coating dispersion can be cured by exposure to ambient temperatures, or alternatively, to elevated temperatures provided by, for example, by an infrared heater.

Figure 5:
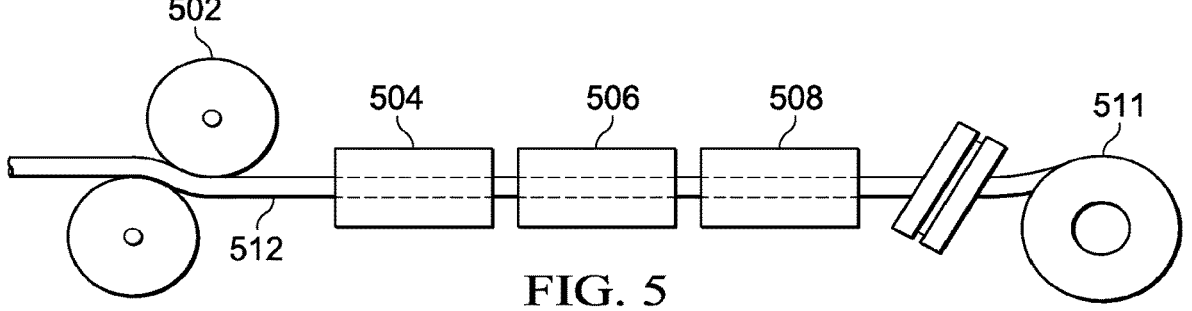
FIG. 5 is a drawing showing a continuous process of the present invention.

As can be appreciated, a coating can be applied in a batch process, a semi-batch process, or a continuous process. FIG. 5 illustrates a continuous coating process and depicts an electric conductor 512 passing from an intake winding roll 502 to a pretreatment unit 504 and coating unit 506. The pretreatment unit 504 can prepare the surface of the conductor for application of the single-part coating dispersion in the coating unit 506. In certain embodiments, after the single-part coating dispersion is applied, the conductor can be dried via a drying/curing unit 508. It will be appreciated, however, as noted above, the single-part coating dispersion can be allowed to cure at ambient temperature. The conductor 512 can be wound on a roller 511.

In the pretreatment unit 504, the surface of the conductor 512 can be prepared by media blasting. Such media can include sand, glass beads, ilmenite, steel shot, and other suitable media. The media blasting can be followed by air-wiping to blow the particulate materials off the conductor 512. In certain embodiments, mechanical methods and/or metal brush cleaning can be used to prepare a conductor surface.

An air-wipe can use jets to blow air on to the conductor 512 at an angle and in a direction opposing the direction of travel of the conductor 512. The air jets can create a 360° ring of air that attaches to a circumference of the conductor 512 and wipes the surface with a high velocity of air. In such an example, as the conductor exits the pretreatment unit 504, any particles adhered to the conductor 512 can be wiped and blown back into the pretreatment unit 504. In certain embodiments, a suitable air jet can operate at about 4 atm to about 7 atm; in certain embodiments, at about 5 atm to about 6 atm; and in certain embodiments, at about 5.5 atm. In certain embodiments, the air jet can have a velocity (coming out of the nozzles) of about 200 kmh to about 800 kmh; in certain embodiments, about 240 kmh to about 640 kmh; and in certain embodiments, about 400 kmh to about 550 kmh. After the air-wipe, in certain embodiments, the number of particles that are greater than about 10 microns in size remaining on the surface of the conductor can be about 11,000 particles per square meter, or less; and in certain embodiments, about 1,100 particles per square meter, or less. After the air wipe, the conductor can be heated, e.g., by a heating oven, UV, IR, E-beam, induction heating, pressurized steam heating, open flame, and the like. The heating can be accomplished by single or multiple units. In one embodiment, the direct flame application can be used for preheating the conductor. Here, the cable can be passed directly through a flame to heat the cable surface to a temperature above ambient temperature. A high heating temperature in pretreatment can allow for a lower heating temperature to be utilized in the drying/curing unit. However, heating should not be so severe where it affects the quality of the coating (e.g., through adherence, evenness, blistering, etc). In certain embodiments, the conductor 512 should not be heated above about 140° C.; and in certain embodiments, to no more than about 120° C.

Figure 6:
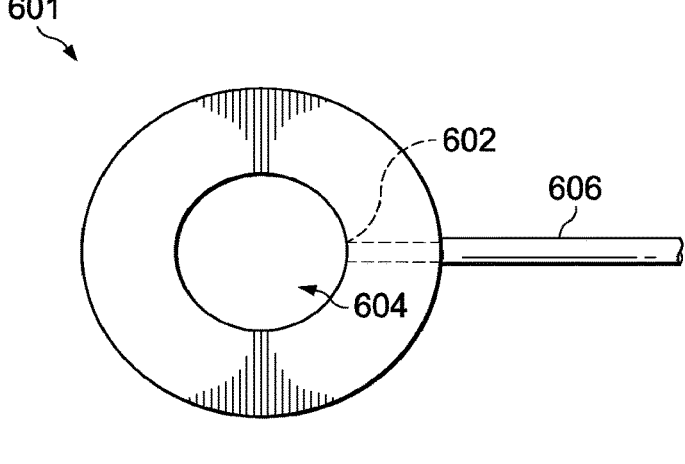
FIG. 6 is drawing showing a cross-section of the flooded die.
Figure 7:
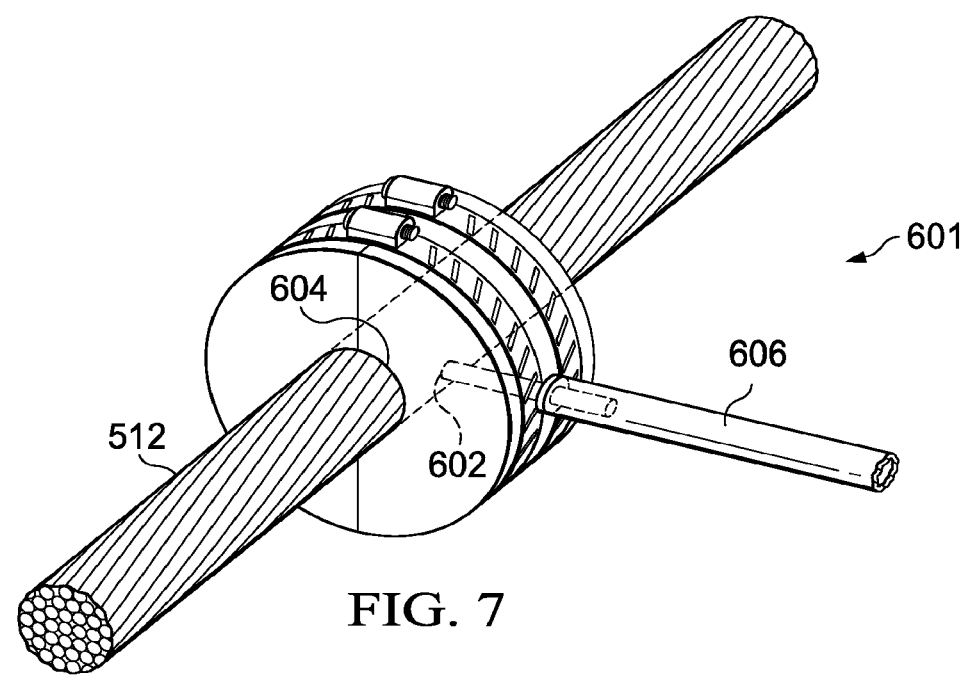
FIG. 7 is a drawing showing a plan view of the flooded die.
Figure 8:
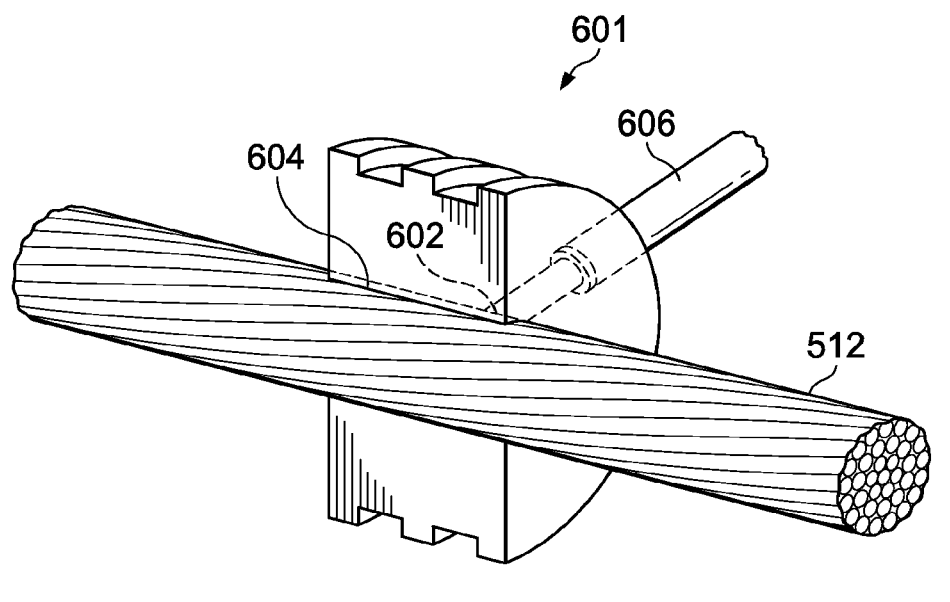
FIG. 8 is a drawing showing a cut-away view of the flooded die.

Once the surface of the conductor 512 is prepared, it can be ready for coating. The coating process can take place in the coating unit where the cable passes through a flooded die that deposits the single-part coating dispersion onto the prepared surface. FIGS. 6 to 8 depict an annular shaped flooded die 601. The single-part coating dispersion can be fed to the die 601 via a tube 606. As the conductor 512 passes though the center opening 604 of the flooded die 601, the single-part coating dispersion coats the conductor 512 via one or more opening ports 602 in the inner surface of the die 601. In certain embodiments, the flooded die 601 can include two or more, four or more, or six or more, opening ports 602 evenly spaced around the circumference of the inner surface. Once the conductor 512 exits the flooded die, the conductor 512 can pass through another air wipe to remove excess of the single-part coating dispersion and to spread the single-part coating dispersion evenly around the conductor. In the case of a stranded conductor, the air wipe can allow the coating to penetrate the grooves between the strands on the surface of the conductor. This air wipe can operate using similar conditions as the air wipe in the pretreatment unit 504.

As described above, once the conductor 512 is coated, the coating can be allowed to cure at ambient temperature. In certain embodiments, the conductor 512 can pass through the drying/curing unit 508, as depicted in FIG. 5. In alternative embodiments, drying/curing can be accomplished by using air or heated air. In certain embodiments, the drying/curing unit can operate with a line speed from about 2.5 meter/min to 152.5 meter/min; and in certain embodiments, about 3 meter/min to 122 meter/min. The temperature of the air and the line speed can be selected based on the metal alloy used in the conductor 512. The drying process can be a gradual drying process, a rapid drying process, and/or a heat application process. As described above, drying can also be accomplished by other techniques (such as UV radiation, IR radiation, E-beam curing), which can accelerate the process without impairing the process or the final coating. The drying process can occur in a single unit or occur in multiple units. The drying process can also occur vertically, horizontally, or at a specific angle. In certain embodiments, the drying/curing can occur by heating up to 200° C. or more without impairing the coating. Once dried/cured, the coated overhead conductor can be wound onto a roller 511 for storage.

Once coated onto a conductor 512 and cured, a thickness of the resulting coating layer can be less than about 100 microns in certain embodiments, and in certain embodiments about 10-30 microns. In certain embodiments, the coating layers produced can be non-white having a L (lightness) value of about 20 or more. The coatings can be electrically non-conductive, semi-conductive, or conductive.

Without further description, it is believed that one of ordinary skill in the art can, using the preceding description and the following illustrative examples, make and utilize the compounds of the present invention and practice the claimed methods. The following example is given to illustrate the present invention. It should be understood that the invention is not to be limited to the specific conditions or details described in this example.

Examples

Table 1 shows formulations for Comparative Examples 1-5, while Table 2 shows formulations for Inventive Examples 1 and 2. Each example formulation was formed by combining the components in the shown percentages by weight, and stirring well, high-speed blending the same for five minutes. Tables 1 and 2 also show the viscosity for each example formulation.

TABLE 1

Coating Formulations for Comparative Examples

| COMPONENTS | Comp. Ex. 1 | Comp. Ex. 2 | Comp. Ex. 3 | Comp. Ex. 4 | Comp. Ex. 5 |
|---|---|---|---|---|---|
| Sodium Silicate | 20.0 | | 29.0 | | |
| Potassium Silicate | | 30.0 | | 8.0 | 8.0 |
| Silica | 37.0 | 20.0 | | 10.0 | 10.0 |
| Titanium Dioxide | | 5.0 | | 12.5 | 12.5 |
| Boron Carbide | 3.0 | | | 3.0 | 3.0 |
| Silicon Carbide | | | 12.5 | | |
| Aluminum Nitride | | | 12.5 | | |
| Talc (Hydrated Magnesium Silicate) | | | | 2.0 | 2.0 |
| Kaolin (Hydrated Aluminum Silicate) | | | | 5.0 | 5.0 |

10

TABLE 1-continued

Coating Formulations for Comparative Examples

| COMPONENTS | Comp. Ex. 1 | Comp. Ex. 2 | Comp. Ex. 3 | Comp. Ex. 4 | Comp. Ex. 5 |
|---|---|---|---|---|---|
| Magnesium Oxide | | | | | 7.5 |
| Amino Silicone | | | 2.5 | | |
| Water | 40.0 | 45.0 | 43.5 | 59.5 | 52.0 |
| VISCOSITY | | | | | |
| With Zahn Cup 3 (after 1 hour) | 6 sec | 6 sec | 7 sec | 6 sec | 8 sec |
| With Zahn Cup 3 (after 24 hours) | 8 sec | Solids separated | 8 sec | Solids separated | Solid |

TABLE 2

Coating Formulations for Inventive Examples

| COMPONENTS | Inv. Ex. 1 | Inv. Ex. 2 |
|---|---|---|
| Potassium Silicate | 1.0 | 0.6 |
| Silica | 20.0 | 21.0 |
| Titanium Dioxide | 10.0 | 21.0 |
| Talc (Hydrated Magnesium Silicate) | 3.0 | |
| Kaolin (Hydrated Aluminum Silicate) | | 5.0 |
| Barium Sulfate | | 5.0 |
| Acrylate | 6.0 | 6.0 |
| Water | 60.0 | 41.4 |
| VISCOSITY | | |
| With Zahn Cup 3 (after 1 hour) | 15 sec | 28 sec |
| With Zahn Cup 3 (after 24 hours) | 16 sec | 29 sec |

Tables 1 and 2 show that each single-part coating dispersion formed from a formulation of Inventive Examples 1 and 2 was able to exhibit a desirable viscosity (e.g., about 10 sec to about 35 sec when measured using a Zahn cup number 3). Besides being necessary for a suitable application of the single-part coating dispersion, especially when a thin coating layer is sought, a low efflux time in the Zahn Cup test, corresponding to a low viscosity, is suggestive of a suitably long pot-life, i.e., the dispersion is not prone to separation. In view of the results, single-part coating dispersions formed from formulations of Inventive Examples 1 and 2 and Comparative Examples 1 and 3 can provide a pot life of at least 24 hours. Single-part coating dispersions formed from a formulation of Comparative Examples 2, 4 and 5 were not able to achieve the requisite viscosity, as they separated or even became solid within 24 hours after the preparation. Comparative Examples 2, 4 and 5, though potentially useful to provide a suitable coating, cannot be single-part coating dispersions, as one or more or their components must be added no more than 1 hour before the application on a bare conductor to form a coated overhead conductor.

Each of the formulations of Comparative Examples 1-5 and Inventive Examples 1 and 2 was applied on an aluminum strip and allowed to cure at ambient temperature. Tests were performed and their results are shown below in Table 3.

TABLE 3

| | Overhead Conductor Testing Results | | | | | | |
|---|---|---|---|---|---|---|---|
| TESTING | Comp. Ex. 1 | Comp. Ex. 2 | Comp. Ex. 3 | Comp. Ex. 4 | Comp. Ex. 5 | Inv. Ex. 1 | Inv. Ex. 2 |
| Dry-to-Touch Time | <30 min | <30 min | <30 min | <30 min | <30 min | <30 min | <1 hour |
| HEAT AGING | | | | | | | |
| At 250° C., for 1 day, 5" Mandrel Bend Test | Pass | Pass | Pass | Pass | Pass | Pass | Pass |
| At 250° C., for 7 days, 5" Mandrel Bend Test | Pass | Pass | Pass | Pass | Pass | Pass | Pass |
| At 250° C., for 1 day, Fingernail Scratch Test | Coating Peeled | Coating Peeled | Coating Peeled | Coating Peeled | Coating Peeled | Coating Adhered | Coating Adhered |
| At 250° C., for 7 days, Fingernail Scratch Test | Coating Peeled | Coating Peeled | Coating Peeled | Coating Peeled | Coating Peeled | Coating Adhered | Coating Adhered |
| WATER AGING | | | | | | | |
| At 90° C., for 7 days, 5" Mandrel Bend Test | Coating Dissolved | Pass | Coating Dissolved | Pass | Pass | Pass | Pass |
| At 90° C., for 7 days, Fingernail Scratch Test | Coating Dissolved | Coating Adhered | Coating Dissolved | Coating Peeled | Coating Adhered | Coating Adhered | Coating Adhered |

As shown in Table 3, overhead conductors coated with coatings formed from formulations of Inventive Examples 1 and 2 outperformed overhead conductors coated with coatings formed from formulations of Comparative Examples 1-5. For example, conductors having coatings formed from formulations of Inventive Examples 1 and 2 passed Mandrel Bend and Fingernail Scratch testing when subjected to each of heat-aging and water-aging. In contrast, no overhead conductor coated with a coating formed from a formulation of Comparative Examples 1-5 was able to pass all the tests after being subjected to heat-aging and water-aging.

Procedures

The viscosity measurements were carried out according to ASTM D4212 (1999).

Heat-aging performance of a coated overhead conductor was carried out by placing the coated overhead conductor in an air-circulating oven maintained at 250° C. for periods of 1 day and 7 days. After heat-aging was complete, each coated overhead conductor was placed at room temperature (e.g., 21° C.) for a period of 24 hours. The coated overhead conductors were then bent on a 5" cylindrical mandrel and the respective coatings of these overhead conductors were observed for any visible cracks. The tested overhead conductor was considered to "Pass" if no visible cracks were present when bent on the 5" mandrel.

The water aging was evaluated by immersing a sample (coated aluminum strip) in the water at 90° C. for a defined time (1 or 7 or 14 or 30 days). The sample is then removed and conditioned at room temperature for 24 hours before performing a test on mandrel as said above, and/or the fingernail scratch test. The results were compared with results obtained before the immersion in water to determine the water resistance of coating.

The Fingernail Scratch Test was performed by trying to gouge at the surface of the cured coating by a fingernail. This test provides indication altogether for hardness and abrasion resistance. The tested coating was considered to "pass" if the coated surface sufficiently retained its coating when firmly abraded by a nail. For example, the designation of "Coating Adhered" in Table 3 represents a coating that "passed." The tested coating was considered to fail if the coating cracks or peels off when firmly abraded by the nail. For example, the designations of "Coating Peeled" and "Coating Dissolved" in Table 3 represent a coating that "failed."

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. An overhead conductor comprising a bare conductor coated with a cured coating composition, the cured coating composition consisting essentially of:

about 30% to 65%, by dry weight, of silicon dioxide or a derivative thereof;

about 10% to about 20%, by dry weight, of one or more acrylates;

about 5% to about 45%, by dry weight, of titanium dioxide;

about 1% to about 25%, by dry weight, of at least one metal selected from Groups IA-IIIA of the periodic table of elements; and optionally, about 1% to about 15%, by dry weight, of a barium sulfate.

2. The overhead conductor of claim 1, wherein the silicon dioxide comprises one or more of amorphous silica, colloidal silica, and crystalline silica.

3. The overhead conductor of claim 1, wherein the silicon dioxide derivative comprises one or more silicates.

4. The overhead conductor of claim 1, wherein the cured coating composition comprises about 40% to about 60%, by dry weight, of a silicon dioxide or a derivative thereof.

5. The overhead conductor of claim 1, wherein the at least one metal comprises one or more of aluminum, potassium, sodium, lithium, magnesium, and calcium.

6. The overhead conductor of claim 1, wherein the one or more acrylates is selected from hydroxy acrylate; epoxy acrylate; (meth)acrylate homopolymer or (meth)acrylate copolymer; polyacrylic acid or salts thereof.

7. The overhead conductor of claim 1, wherein the cured coating composition comprises about 8% to about 40%, by dry weight, of titanium dioxide.

8. The overhead conductor of claim 1, wherein the cured coating composition comprises up to about 9%, by dry weight, of barium sulfate.

9. A method of making a coated overhead conductor, the method comprising:

preparing a single-part coating dispersion, the coating dispersion comprising:

about 1% to about 25%, by weight, of silicon dioxide;

about 0.3% to about 10%, by weight, of one or more metal silicates, wherein the metal of the metal silicate is selected from Groups IA-IIIA of the periodic table of elements;

about 3% to about 10%, by weight, of one or more acrylates;

about 2% to about 25%, by weight, of titanium dioxide; and about 30% to about 70%, by weight, of water;

applying the coating dispersion to a bare overhead conductor; and curing the coating dispersion at ambient temperature to form the coated overhead conductor;

wherein the coating dispersion has a pot life of about 24 hours or longer.

10. The method of claim 9, wherein the coating dispersion comprises about 5% to about 22%, by weight, of silicon dioxide.

11. The method of claim 9, wherein the coating dispersion further comprises about 0.5% to about 9%, by weight, of barium sulfate.

12. The method of claim 9, wherein the coating dispersion is curable at ambient temperature in less than one hour.

* * * * *